April 17, 1962 W. G. SCHWANKE ET AL 3,029,533
SNOW PLOW ATTACHMENT FOR ROTARY TYPE LAWNMOWERS
Filed March 18, 1959 2 Sheets-Sheet 1

Inventors
Walter G. Schwanke
Arthur D. Pelzer
Helmuth O. Vogel
Attorney

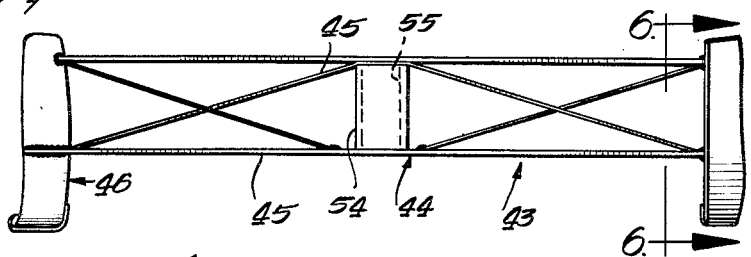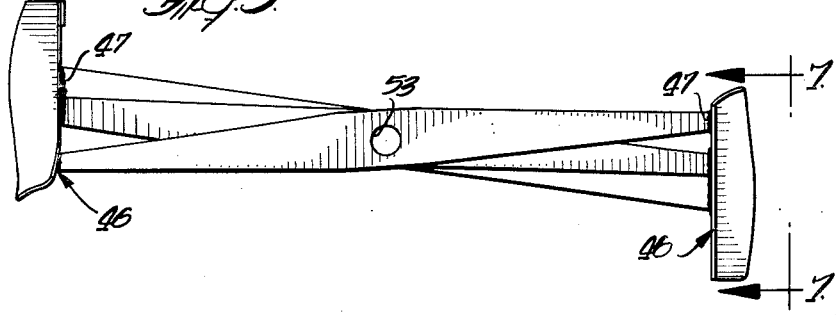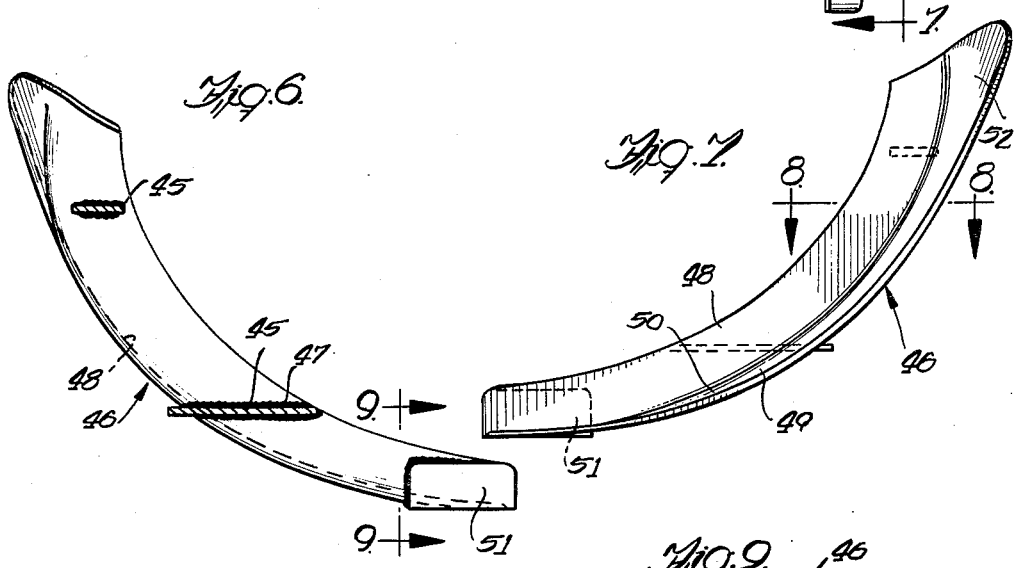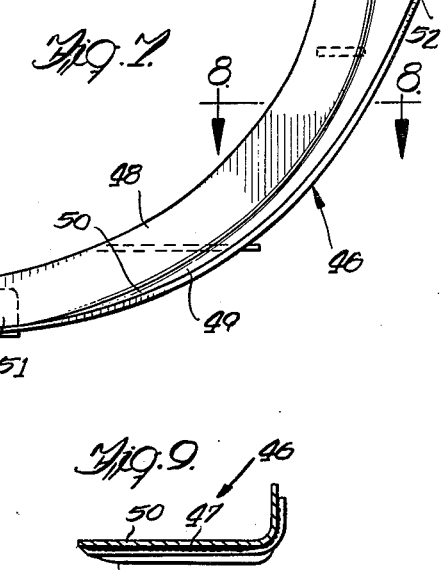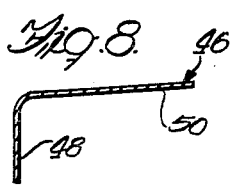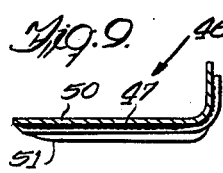

3,029,533
SNOW PLOW ATTACHMENT FOR ROTARY TYPE LAWNMOWERS
Walter G. Schwanke and Arthur D. Pelzer, both of 2502 S. Grove Ave., Berwyn, Ill.
Filed Mar. 18, 1959, Ser. No. 800,226
7 Claims. (Cl. 37—43)

This invention relates to a snowplow attachment. More specifically the invention relates to a snowplow attachment particularly adapted to lawnmowers of the rotary type.

It is a prime object of this invention to provide a snowplow attachment which will quickly convert a conventional rotary lawnmower into a snowplow for use during winter operations.

It is a still further object to provide a snowplow attaching assembly which may be utilized to provide a rotary lawnmower with the facility of being usable the year round particularly in regions where snow is encountered during the winter months.

Still another object is the provision of an improved attaching assembly adapted to convert a rotary lawnmower into a snowplow, the said assembly including a minimum number of parts and being readily attachable and detachable from the conventional housing of a rotary lawnmower.

A still further object is the provision of an improved snowplow assembly wherein the snowplow includes a frame driven about a vertical shaft by means of a power unit, the said unit including a throttle control, the said snowplow including a feeler element which is adapted to automatically regulate the throttle control depending upon the volume of snow which is being fed into the plow.

A still further object is the provision of an improved snow flinger attachment which is readily adapted for attachment to the vertical shaft of a power lawnmower, the said snowplow attachment comprising a frame including shoes which are efficient to centrifugally direct and fling snow through the discharge opening of a power mower casing.

A still further object is the provision of an improved snow flinger attachment for vertical shaft driven power mowers, the said flinger attachment comprising a pair of improved snow flinger shoes shaped to efficiently discharge snow from the casing of the mower.

These and other objects will become more readily apparent from a reading of the description when examined in connection with the accompanying sheets of drawings.

In the drawings:

FIGURE 4 is an enlarged rear elevational view of a snow flinger;

FIGURE 5 is a plan view of a snow flinger;

FIGURE 6 is a view taken substantially along the lines 6—6 of FIGURE 4;

FIGURE 7 is a side elevational view taken substantially along the lines 7—7 of FIGURE 5;

FIGURE 8 is a cross-sectional view taken along the lines 8—8 of FIGURE 7; and

FIGURE 9 is a cross-sectional view taken along the lines 9—9 of FIGURE 6.

Figure 1:
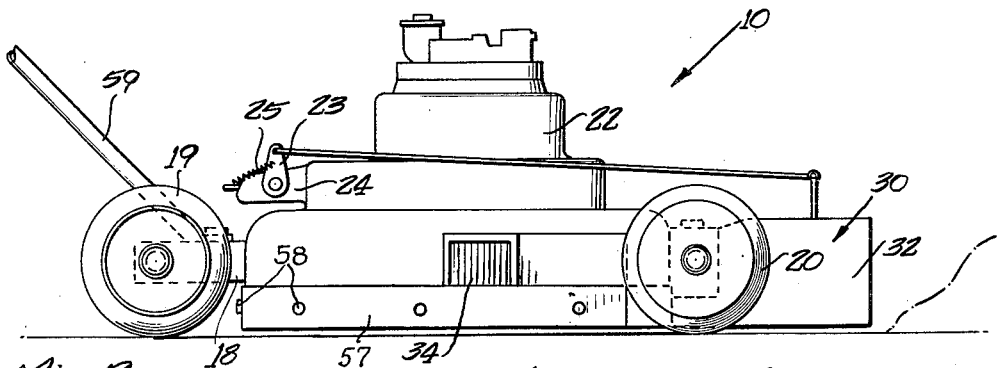
FIGURE 1 is a side elevational view of an improved mower and snowplow combination.
Figure 2:
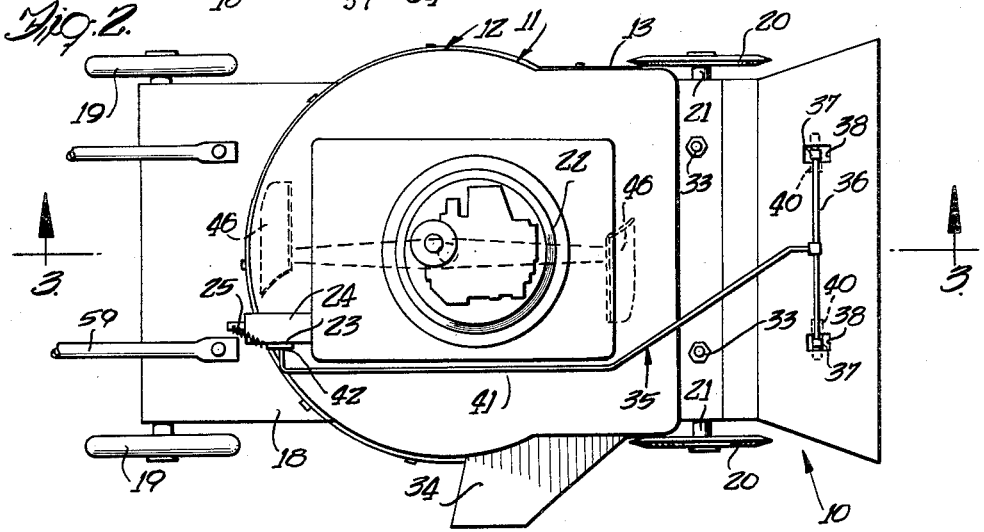
FIGURE 2 is a plan view of the combination shown in FIGURE 1.

Referring now particularly to FIGURE 1, a mower and snowplow combination is generally designated by the reference character 10. The mower and snowplow combination 10 comprises a housing 11, having a rear cylindrical housing portion 12, and a forward portion 13. The cylindrical housing portion 12, includes a cylindrical wall 14, and the forward portion 13, comprises forwardly extending side walls 15. The side walls 15, are connected to a top wall 16, and with said top wall 16 define a throat portion generally indicated at 17. A U-shaped type of forward extension includes an upper wall 17', suitably connected to the wall 16, the said top wall 17' being suitably connected to downwardly extending axle supports 17". A rearward extension is designated at 18, the said extension 18 being connected to the rearward portion of the housing 11. The rearward extension 18 suitably supports a pair of laterally spaced ground wheels 19. A pair of disk type wheels 20, are suitably connected for rotation to the downwardly extending axle supports 17" by means of stub shafts 21. The wheels 20, may be suitable metal disks which can quickly be placed in position by removal of the ordinary rubber tired wheels of a mower which are not shown. The disk type wheels 20, suitably break up the snow when the combination 10, is utilized for snowplowing. The mower and snowplow combination 10 further includes a power unit or motor designated at 22. The motor 22, may be of the internal combustion type including a power or throttle control arm 23, which is pivotally and suitably mounted on a carburetor 24. A spring 25, suitably connected to a portion of the carburetor 24, is connected to the arm 23, the said spring 25, urging the arm 23, into a flow idle position. The motor 22, is suitably mounted on the housing 11, by means of a motor mount 26, from which a bearing 27, projects. A shaft 28, extends vertically downwardly into the housing 11, the said shaft being suitably driven by the motor 22. A snow chute is generally designated at 30, and includes an upper wall 31, and downwardly extending laterally spaced side walls 32, forming a suitable throat in registry with the throat portion or opening 17. The snow chute 30, may be simply and quickly attached to the top wall 16 by means of bolts and nuts 33. The housing 11, as best shown in FIGURES 1 and 2 includes a conventional discharge chute 34. A throttle control assembly is generally designated at 35, the said assembly comprising a transversely extending rod 36, which is provided at its ends with downwardly extending links 37, which project through openings 38, in the upper wall 31. The links 37, are suitably pivoted on the chute 30, as indicated at 39. Each of the links 37, includes a feeler plate 40, which is disposed in the throat formed by the side walls 32. A link 41, is suitably connected to the rod 36, the link 41 in turn also being connected to the throttle arm 23, as indicated at 42.

Referring now particularly to FIGURES 3, 4, 5, 6, 7, 8 and 9, a snow flinger is generally designated by the reference character 43.

The flinger 43 comprises a frame 44, including a plurality of frame members 45. A pair of flinger shoes or flinger elements are designated at 46, one of these being connected at opposite ends of the frame 44. The finger elements 46, as best shown in FIGURE 6, may be suitably connected to the frame members 45, by means of welding designated at 47.

Figure 3:
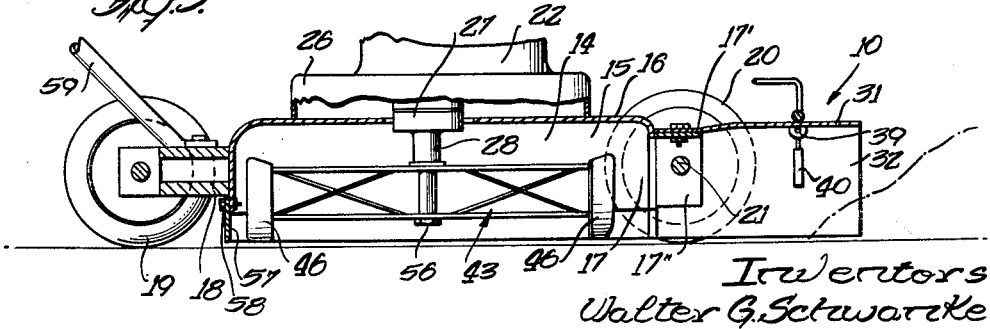
FIGURE 3 is a cross-sectional view taken along the line 3—3 of FIGURE 2.

Each flinger shoe comprises a vertical flange 48, the said shoes and the flanges 48, extending substantially parallel with respect to each other and extending transversely with respect to the frame members 45. Each shoe or flinger element 46, further includes a wall 49, having an upper snow receiving surface 50. As best shown in FIGURE 7, wherein one of the flinger shoes is shown in side elevation, the flange 48 and wall 49, gradually slopes upwardly in arcuate fashion. As shown in FIGURE 9, the wall 49, is substantially at a right angle with respect to the flange 48, and as shown in FIGURES 7 and 8, as the wall 49, slopes upwardly it also changes relative to the flange 48, since the angularity between the flange 48, and wall 49 gradually increases toward the rearmost end 52, which in effect forms a mold board type of configuration. The forward end of each wall 49, is also provided with a reinforcing plate 51. As shown in FIGURE 5, the frame members 45 are provided with openings 53, communicating with a bearing or spacer 54, having a suitable bore 55. As shown in FIGURE 3, the flinger 43, can easily be connected to the shaft 28, by means of a bolt 56. The shaft 28, is conventionally provided with a threaded bore (not shown) for receiving such bolt 56 when the mower is used with a mower blade.

It is a simple matter to convert a typical rotary mower into a snowplow with the present invention. The regular front wheels of the mower are removed and the disk type wheels 20 are placed in position. The lower portion of the cylindrical wall 14, is drilled with a number of holes and a suitable skirt 57, is rigidly connected thereto by means of bolt and nut assemblies 58. This encloses the housing for snow operations. The chute 30, is easily attached by drilling suitable holes and inserting the bolts 33. The throttle control 35, is assembled with the chute 30, and is suitably connected to the throttle link as indicated at 42. The regular mower blade is removed and the flinger assembly 43, is fastened in position. The snowplow is now ready for operation and it can be seen that a quick conversion can be made. In many instances the holes can be pre-drilled by the factory when the mower is sold and thus the conversion units also may be supplied by the same manufacturer. Thus quick convertibility is assured.

During operation the motor is started and the operator grasps the handle 59, and moves the combination 10, in the same manner as in mowing. Snow entering into the throat 17 engages the feeler elements 40, and during large quantities, the feeler elements 40, are more progressively pushed rearwardly thereby moving the link 41, forwardly and the throttle control arm 23 forwardly overcoming the tension of the spring 25, whereupon the throttle is further opened and more power is derived from the motor 22.

By virtue of the novel shape of the flinger elements 46, the snow is scooped up on the surface 50, and by virtue of the gradual angle or mold board type of configuration of the rearward portion of the flinger as indicated by the rear portion 52, the snow is efficiently hurled centrifugally outwardly through the discharge chute 34.

Thus it can be seen that an improved mower and snowplow combination has been described, the objects have been fully achieved and it must be understood that changes and modifications may be made in the invention without departing from the spirit thereof or from the scope as defined in the appended claims.

What is claimed is:

1. A snow flinger implement comprising a housing having a cylindrical portion comprising a top wall and a circumferentially extending outer wall including a forward opening and a laterally disposed discharge opening, a power unit on said top wall, said unit having a power control means, a driven shaft connected to said power unit and extending vertically into said housing, a plurality of ground wheels connected to said housing, a snow flinger attachment comprising a cylindrical skirt, means removably connecting said cylindrical skirt to said outer wall whereby said skirt projects downwardly in substantially close proximity to the ground, a chute having an enlarged receiving throat at its forward end, means removably connecting said chute over the opening of said outer wall to direct snow to said housing, an actuating element disposed in said throat, said actuating element being variably movable in response to variable quantities of snow feeding into said throat, means connecting said actuating element to said power control means to vary the power of said power unit, a snow flinger comprising a transversely extending supporting frame within said housing, means removably attaching said shaft to said frame substantially centrally thereof to rotate said frame about a vertical axis, and a pair of snow flinger elements connected to each of the opposite ends of said frame and extending transversely with respect thereto, each flinger element comprising an L-shaped body in cross-section, and including an upright flange and a lower wall extending laterally with respect thereto at approximately a right angle, said wall having a snow receiving upper surface having a forward end portion and a rearward end portion, and being of arcuate shape with said surface at its forward portion being substantially horizontal and gradually sloping upwardly to said rearward portion, the angle between said rearward portion and said flange gradually increasing obtusely whereby snow on said surface is centrifugally flung outwardly through said discharge opening during rotation of said frame.

2. A snow flinger implement comprising a housing having a cylindrical portion comprising a top wall and a circumferentially extending outer wall including a forward opening and a laterally disposed discharge opening, a power unit on said top wall, a driven shaft connected to said power unit and extending vertically into said housing, a plurality of ground wheels connected to said housing, a snow flinger attachment comprising a cylindrical skirt, means removably connecting said cylindrical skirt to said outer wall whereby said skirt projects downwardly in substantially close proximity to the ground, a chute having an enlarged receiving throat at its forward end, means removably connecting said chute over the opening of said outer wall to direct snow to said housing, a snow flinger comprising a transversely extending supporting frame within said housing, means removably attaching said shaft to said frame substantially centrally thereof to rotate said frame about a vertical axis, and a pair of snow flinger elements connected to each of the opposite ends of said frame and extending transversely with respect thereto, each flinger element comprising an L-shaped body in cross-section, and including an upright flange and a lower wall extending laterally with respect thereto at approximately a right angle, said wall having a snow receiving upper surface having a forward end portion and a rearward end portion, and being of arcuate shape with said surface at its forward portion being substantially horizontal and gradually sloping upwardly to said rearward portion, the angle between said rearward portion and said flange gradually increasing obtusely whereby snow on said surface is centrifugally flung outwardly through said discharge opening during rotation of said frame.

3. A snow flinger implement comprising a housing having a cylindrical portion comprising a top wall and a circumferentially extending outer wall including a forward opening and a laterally disposed discharge opening, a power unit on said top wall, a driven shaft connected to said power unit and extending vertically into said housing, a plurality of ground wheels connected to said housing, a snow flinger attachment comprising a chute having an enlarged receiving throat at its forward end, means removably connecting said chute over the opening of said outer wall to direct snow to said housing, a snow flinger comprising a transversely extending supporting frame within said housing, means removably attaching said shaft to said frame substantially centrally thereof to rotate said frame about a vertical axis, and a pair of snow flinger elements connected to each of the opposite ends of said frame and extending transversely with respect thereto, each flinger element comprising an L-shaped body in cross-section, and including an upright flange and a lower wall extending laterally with respect thereto at approximately a right angle, said wall having a snow receiving upper surface having a forward end portion and a rearward end portion, and being of arcuate shape with said surface at its forward portion being substantially horizontal and gradually sloping upwardly to said rearward portion, the angle between said rearward portion and said flange gradually increasing obtusely whereby snow on said surface is centrifugally flung outwardly through said discharge opening during rotation of said frame.

4. A snow flinger implement comprising a housing having a cylindrical portion comprising a top wall and a circumferentially extending outer wall including a forward opening and a laterally disposed discharge opening, a power unit on said top wall, a driven shaft connected to said power unit and extending vertically into said housing, a plurality of ground wheels connected to said housing, a snow flinger attachment comprising a chute having a receiving throat at its forward end, means removably connecting said chute over the opening of said outer wall to direct snow to said housing, a snow flinger comprising a transversely extending supporting frame within said housing, means attaching said shaft to said frame substantially centrally thereof to rotate said frame about a vertical axis, and a pair of snow flinger elements connected to each of the opposite ends of said frame and extending transversely with respect thereto, each flinger element comprising an L-shaped body in cross-section, and including an upright flange and a lower wall extending laterally with respect thereto at approximately a right angle, said wall having a snow receiving upper surface having a forward end portion and a rearward end portion, and being of arcuate shape with said surface at its forward portion being substantially horizontal and gradually sloping upwardly to said rearward portion, the angle between said rearward portion and said flange gradually increasing obtusely whereby snow on said surface is centrifugally flung outwardly through said discharge opening during rotation of said frame.

5. A snow flinger implement comprising a housing having a cyylindrical portion comprising a top wall and a circumferentially extending outer wall including a forward opening and a laterally disposed discharge opening, a power unit on said top wall, a driven shaft connected to said power unit and extending vertically into said housing, a plurality of ground wheels connected to said housing, a snow flinger attachment comprising a chute having an enlarged receiving throat at its forward end, means connecting said chute over the opening of said outer wall to direct snow to said housing, a snow flinger comprising a transversely extending supporting frame within said housing, means attaching said shaft to said frame substantially centrally thereof to rotate said frame about a vertical axis, and a pair of snow flinger elements connected to each of the opposite ends of said frame and extending transversely with respect thereto, each flinger element comprising an L-shaped body in cross-section, and including an upright flange and a lower wall extending laterally with respect thereto, said wall having a snow receiving upper surface having a forward end portion and a rearward end portion, and said surface at its forward portion being substantially horizontal and gradually sloping arcuately upwardly to said rearward portion, the angle between said rearward portion and said flange increasing obtusely whereby snow on said surface is centrifugally flung outwardly through said discharge opening during rotation of said frame.

6. A snow flinger implement comprising a housing having a cylindrical portion and including a discharge chute, a power unit associated with said housing, a vertical shaft connected to said power unit to be driven thereby and projecting downwardly into said housing, a snow flinger connected to said shaft, said snow flinger comprising a transversely extending frame having a central connecting means connecting said flinger to said shaft for rotation therewith, a snow flinger shoe connected to each of the opposite ends of said frame and extending transversely with respect to said frame, each shoe including a wall having an upper snow receiving surface, said surface extending initially horizontally, then arcuately upwardly said surface having a rearward portion gradually sloping angularly with respect to said horizontal surface whereby snow on said wall is flung outwardly through said chute during rotation of said shaft and flinger.

7. A snow removal implement comprising a housing having a cylindrical portion open at its lower end and including a forward snow receiving chute communicating with said cylindrical portion, a discharge chute associated with said cylindrical portion, a driven shaft on said cylindrical portion for rotation about a vertical axis, power means on said implement for rotating said shaft, a snow flinger, said snow flinger comprising a transversely extending frame having a central connecting means connecting said frame to said shaft for rotation therewith, an L-shaped snow flinger shoe connected to each of the opposite ends of said frame and extending transversely with respect to said frame, each shoe including a horizontal wall having an upper snow receiving surface, a vertical wall connected to said horizontal wall, said snow receiving surface having a forward portion extending initially horizontally outwardly at a certain angle from said vertical wall, then sloping arcuately upwardly and including a rearward portion, the angle between said rearward portion and said vertical wall being greater than the angle between said forward portion and said vertical wall whereby snow on said surface is flung outwardly through said discharge chute.

References Cited in the file of this patent
UNITED STATES PATENTS

| | | |
|---|---|---|
| 533,510 | Van Beck | Feb. 5, 1895 |
| 626,095 | Reed | May 30, 1899 |
| 2,381,017 | Wandscheer | Aug. 7, 1945 |
| 2,807,126 | Bennett | Sept. 24, 1957 |
| 2,863,163 | Draughon | Dec. 9, 1958 |
| 2,889,641 | Rechenberg | June 9, 1959 |